United States Patent
Kawamoto

(10) Patent No.: US 6,486,971 B1
(45) Date of Patent: Nov. 26, 2002

(54) DIGITAL IMAGE FORMING APPARATUS AND METHOD FOR CHANGING MAGNIFICATION RATIO FOR IMAGE ACCORDING TO IMAGE DATA STORED IN A MEMORY

(75) Inventor: Hiroyuki Kawamoto, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/266,800

(22) Filed: Mar. 12, 1999

(30) Foreign Application Priority Data

Mar. 12, 1998 (JP) .......................................... 10-080447

(51) Int. Cl.[7] ................................................ H04N 1/23
(52) U.S. Cl. ...................................... 358/1.2; 358/296
(58) Field of Search .......................... 358/1.1, 1.2, 1.9, 358/1.12, 1.16, 1.18, 296, 401, 444, 468

(56) References Cited

U.S. PATENT DOCUMENTS

| 5,901,278 A | * | 5/1999 | Kurihara et al. | ............ 358/444 |
| 5,987,227 A | * | 11/1999 | Endo et al. | ................. 358/468 |
| 6,226,102 B1 | * | 5/2001 | Koike et al. | ................. 358/1.9 |

FOREIGN PATENT DOCUMENTS

JP          9-130582          5/1997

* cited by examiner

*Primary Examiner*—Kimberly A. Williams
(74) *Attorney, Agent, or Firm*—Oblon, Spivak, McClelland, Maier & Neustadt, P.C.

(57) ABSTRACT

An image forming apparatus includes a photoconductor and an image reading device to receive and read a light reflected from an original document carrying image data of an image of the original document and to convert the received light carrying the image data into an analog electrical signal carrying the image data. An analog-to-digital converter converts the analog electrical signal carrying the image data into a digital signal carrying the digital image data and a memory stores the digital image data. An image writing device forms an image according to the digital image data on a surface of the photoconductor with a laser beam modulated according to the digital image data. The image forming apparatus includes a first enlarging/reducing device to change a magnification ratio of the image and is provided upstream of the memory in a direction in which the digital image data is sent. Also included is a second enlarging/reducing device which changes a magnification ratio for the image and is provided downstream of the memory in the direction in which the digital image data is sent. The digital image data processed with the first enlarging/reducing device is stored in the memory and the digital image date reed from the memory is again processed with the second enlarging/reducing device.

18 Claims, 8 Drawing Sheets

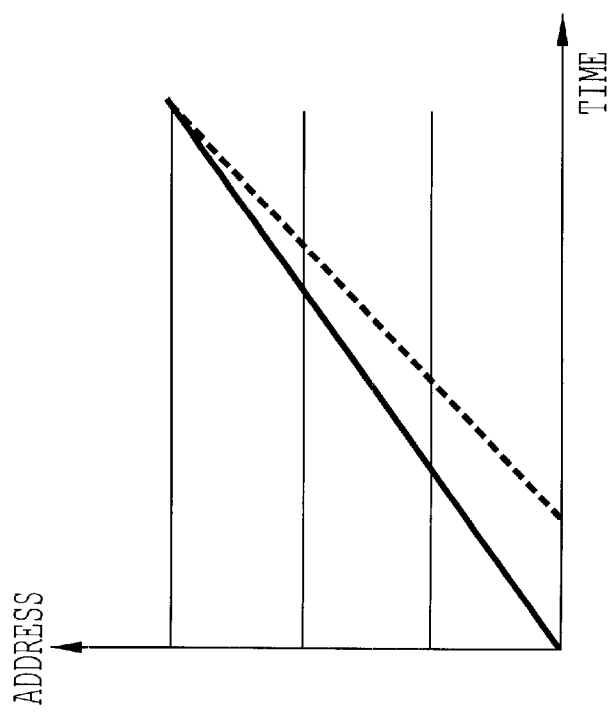
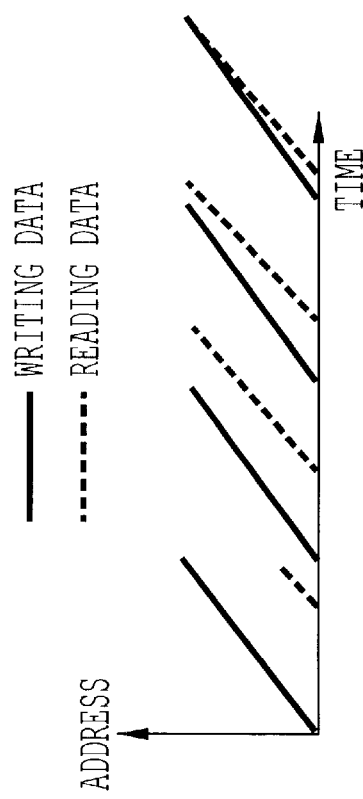
FIG.9(a)
FIG.9(b)

DIGITAL IMAGE FORMING APPARATUS AND METHOD FOR CHANGING MAGNIFICATION RATIO FOR IMAGE ACCORDING TO IMAGE DATA STORED IN A MEMORY

BACKGROUND OF THE INVENTION

1. Field of the Invention

The present invention relates to a digital image forming apparatus in which an image of an original document is formed on a surface of a photoconductor by converting optically read image information of the original document into an analog electrical signal carrying the image information, converting the analog electrical signal to a digital signal carrying the image information and exposing the surface of the photoconductor with a laser beam modulated in accordance with the digital signal carrying the image information. More particularly the invention relates to a digital image forming apparatus capable of storing image data of an original document in a memory and changing a magnification ratio for the image according to the image data stored in the memory.

2. Discussion of the Background

In a digital image forming apparatus, an image of an original document, which is placed on a contact glass with the surface carrying the image facing downward, is read with an image reading device by illuminating the original document with a light source and imaging a light, which is reflected from the original document and which carries image information of the original document, on an image sensor as the image reading device by way of a lens system. The image sensor converts the received light carrying the image information into an analog electrical signal carrying the image information, which is then converted to a digital signal carrying the image information. Various image processing operations are then applied to the digital signal, for example, for enhancing the quality and changing the size of the outputting image.

A laser beam is modulated according to the digital signal carrying the image information end a latent image for the image information is formed on a surface of a photoconductor by the modulated laser beam. The latent image is then developed with toner to form a visible toner image. The toner image is transferred onto a sheet, which is conveyed from a sheet feeding device of the apparatus, to thereby form the image of the original document on the sheet.

A digital image forming apparatus as described above generally has a memory to store image data of an original document, which is obtained by reading the original document with an image reading device. An image of the original document is formed by reading out the image data of the original document from the memory. The digital image forming apparatus having such a memory to store image data of an original document can form, therefore, the image of an original document on a plurality of sheets, without repeatedly reading the original document in order to form the image on each of the plurality of sheets.

Further, when outputting a plurality of sets of a plurality of original documents with such a digital image forming apparatus, it is desired that each outputted set of the plurality of original documents is stacked and sorted on an exit tray such that the user can easily separate each outputted set of the original documents from other sets. Therefore, image data is generally rotated 90 degrees or 270 degrees such that the image is formed as rotated for each set of the plurality of original documents and thereby each produced set of the plurality of original documents is stacked on the exit tray one after another being alternately directed sideways and lengthways, thus enabling the easy separation of each outputted set from others on the exit tray.

When an image of an original document is read by such a digital image forming apparatus as described above, the image generally is not read in exactly the same size as the original image due to, for example, the optical characteristics of the apparatus. Therefore, when the image is formed, after being enlarged or reduced, according to the image data stored in the memory device, the size of the outputted image may further differ from the original size by, for example, 1%.

Japanese Patent Laid-open Publication No. 9-130582 describes an example of such a digital image forming apparatus having a memory to store therein image data of an original document, which is obtained by reading the original document by an image reading device. The Publication describes a technology to prevent generating a difference between the magnification ratios for the vertical and lateral directions of the image when the image is rotated 90 degree or 270 degree.

In addition, there is a need to output a plurality of images of an original document with slightly changing the magnification ratio for each of the plurality of images, such as for example, changing the magnification ratio for the image in a step of 1%. Particularly, when the original document is large, such as for example, an A0 size, there is a particular need to output a plurality of images of the original document while changing the magnification to avoid reading the original document each time when outputting an image with a different magnification. This factor is significant because the large sized document is not easy to place on a contact glass of an image forming apparatus.

SUMMARY OF THE INVENTION

In order to overcome the above-described and other problems with background apparatus and to meet the above-described need, preferred embodiments of the present invention provide a digital image forming apparatus and method which are capable of storing image data of an original document in a memory and changing the magnification ratio for the image according to the image data stored in the memory.

According to a preferred embodiment of the present invention, an image forming apparatus includes a photoconductor and an image reading device to receive and read a light reflected from an original document carrying image data of an image of the original document and to convert the received light carrying the image data into an analog electrical signal carrying the image data. An analog-to-digital converter converts the analog electrical signal carrying the image data into a digital signal carrying the digital image data and a memory to store the digital image data. An image writing device forms an image according to the digital image data on a surface of the photoconductor with a laser beam modulated according to the digital image data. According to the present invention, the image forming apparatus includes a first enlarging/reducing device to change a magnification ratio for the image, is provided upstream of the memory in a direction in which the digital image data is sent. A second enlarging/reducing device is produced to change a magnification ratio for the image, is provided downstream of the memory in the direction in which the digital image data is sent. The digital image data processed with the first enlarging/reducing device is stored in the memory and the digital image data read from the memory is again processed with the second enlarging/reducing device.

According to another embodiment of the present invention, the image forming apparatus includes an image quality enhancing device to process the digital image data to enhance a quality of the image according to the digital image data. The digital image data processed with the first enlarging/reducing device is stored in the memory after having been processed with the image quality enhancing device, and the digital image data read from the memory is again processed with the second enlarging/reducing device.

According to still another embodiment of the present invention, the image forming apparatus includes a single enlarging/reducing device to change a magnification ratio for the image. A first switch device switches the digital image data to the enlarging/reducing device upstream of the memory in a direction in which the digital image data is sent, and a second switch device switches the digital image data read from the memory to the enlarging/reducing device to change a magnification ratio for the image.

According to still another embodiment of the present invention, a capacity of a FIFO memory used in the second enlarging/reducing device is smaller than a capacity of a FIFO memory used in the first enlarging/reducing device.

BRIEF DESCRIPTION OF THE DRAWINGS

A more complete appreciation of the present invention and many of the attendant advantages thereof will be readily obtained as the same becomes better understood by reference to the following detailed description when considered in conjunction with the accompanying drawings, wherein:

FIGS. 9(a) and 9(b) are diagrams for explaining the operation of the FIFO memory when reducing an image, FIG. 9(a) explaining the operation when the FIFO memory has the memory capacity to store image data for one line of the main scanning, and FIG. 9(b) explaining the operation when the FIFO memory has a limited memory capacity.

DETAILED DESCRIPTIONS OF THE PREFERRED EMBODIMENTS

Figure 1:
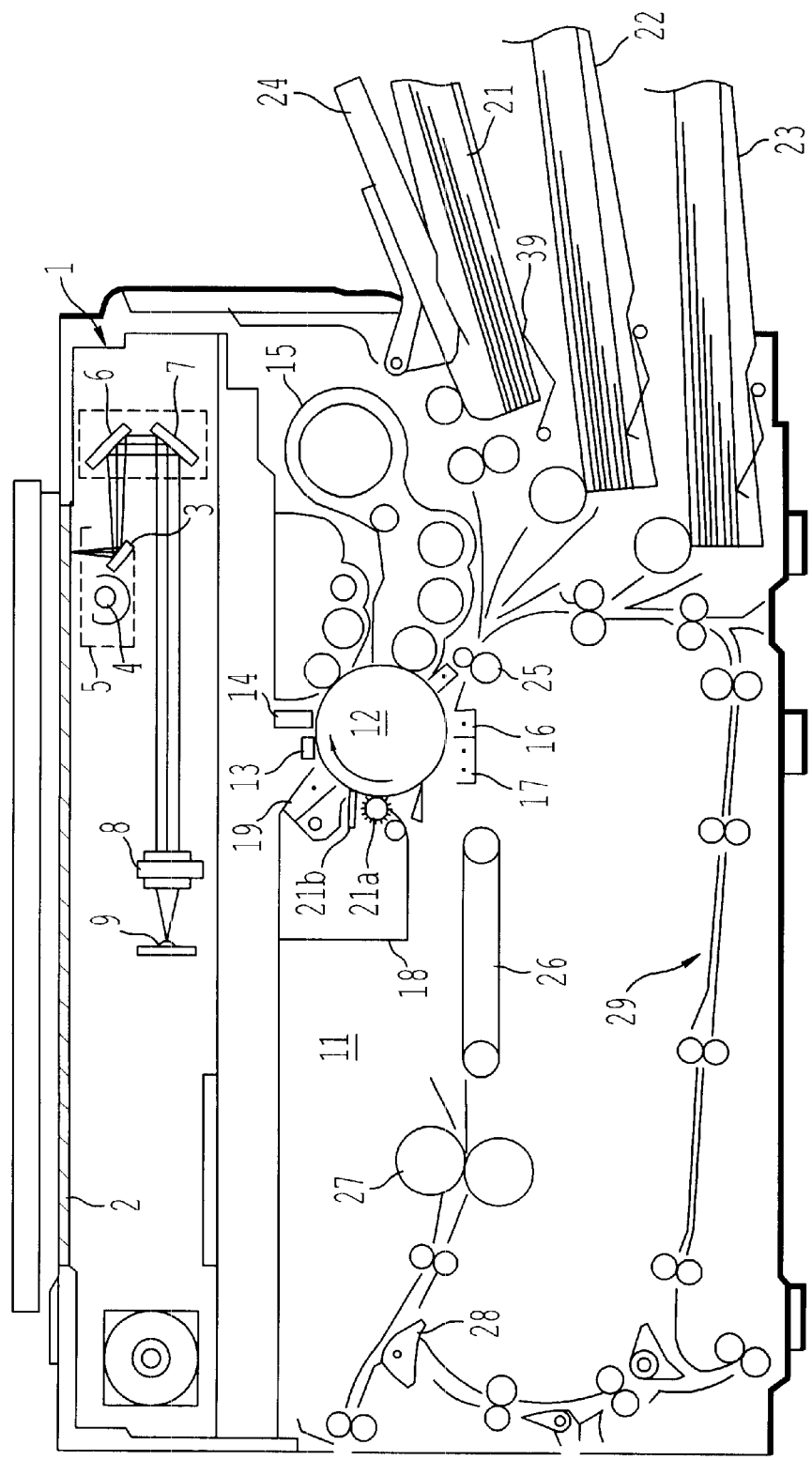
FIG. 1 is a schematic drawing illustrating an exemplary structure of a digital image forming apparatus according to the present invention.

Referring now to the drawings, wherein like reference numerals designate identical or corresponding devices throughout several views, preferred embodiments of the present invention are now described.

FIG. 1 illustrates a structure of a digital image forming apparatus according to a preferred embodiment of the present invention. An image reading unit 1 includes a contact glass 6, provided at an upper side of the apparatus, receive an original document thereupon. A light source 4 is arranged to move in a horizontal direction, i.e., the sub scanning direction, beneath the contact glass 2. A mirror 3 is arranged beneath the light source 4 so as to reflect a light from the original document to the horizontal direction. The light source 4 and the mirror 3 are packaged in a case 5 so as to move integrally. A mirror 6 and a mirror 7 are arranged so as to reflect the light from the mirror 3 by 90 degrees, respectively, and are configured to integrally move as the light source 4 moves.

The mirror 6 reflects the light from the mirror 3 downward and the mirror 7 is arranged below the mirror 6 to reflect the light from the mirror 6 in the opposite direction. A lens 8 is arranged in a light path for the mirror 7 and an image sensor 9 is placed in a focusing position of the lens 8. In this embodiment, a charge-coupled device (CCD) is used for the image sensor 9.

A printer unit 11 includes an image forming system and a recording sheet feeding system. The image forming system includes a photoconductor drum 12 to form a latent image thereupon, a charging device 13 to uniformly charge the surface of the photoconductor drum 12, a laser array unit 14 to emit a laser beam, a developing device 15 using toner to develop the latent image on the surface of the photoconductor drum 12 to form a toner image, a transfer device 16 to transfer the toner image onto a recording sheet, a separation device 17 to separate the recording sheet carrying the toner image thereupon from the photoconductor drum 12, a cleaning device 18 to clean the surface of the photoconductor drum 12 after the toner image is transferred to the recording sheet, a discharging lamp 19 to remove a residual charge from the surface of the photoconductor drum 12.

The recording sheet feeding system includes recording sheet feeding cassettes 21, 22 and 23 to feed a recording street for transferring a toner image thereupon, a manual sheet feeding tray 24 to manually feed a recording sheet, a registration roller 25, a conveying belt 26 to convey a recording sheet, a fixing device 27 to fix a toner image which is transferred from the surface of the photoconductor drum 12 onto the recording sheet, a separation claw 28 to guide the recording sheet, and a duplex conveying path 29 to convey the recording sheet carrying a toner image to the transfer device to transfer another toner image onto another side of the recording sheet.

The digital image forming apparatus configured as described above forms a latent image according to image information of an original document on a surface of the photoconductor drum 12 by causing the laser array unit 14 to emit a laser beam modulated according to the image information. The latent image is then developed with toner to a toner image by the developing device 15. A recording sheet fed from one of the sheet feeding cassettes 21, 22 and 23 waits at the registration roller 25 to be fed to a transfer place, where the toner image is transferred to the recording sheet with the transfer device 14, at such a timing that the leading edge of the recording sheet registers with a leading edge of the toner image at the transfer place.

The recording sheet carrying the transferred toner image is conveyed by the conveying belt 26 to the fixing device 27, where the toner image is fixed onto the recording sheet. The recording sheet is then discharged from the apparatus or conveyed to the duplex conveying path 29. The surface of the photoconductor drum 12, from which the recording sheet is separated, is cleaned with the cleaning device 18 and is then discharged with the discharging lamp 19. The surface of the photoconductor drum 12 is then uniformly charged with the charging device 13 for a subsequent image forming operation.

Figure 2:
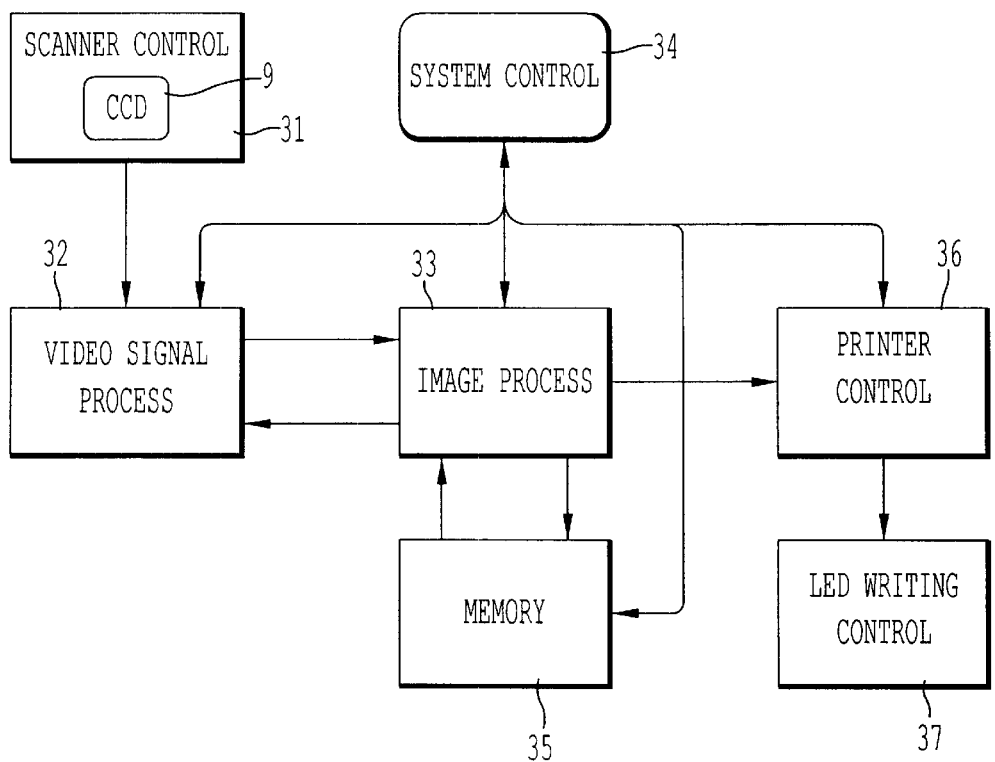
FIG. 2 is a block diagram illustrating an exemplary construction of a control system of the digital image forming apparatus of FIG. 1.

FIG. 2 illustrates an exemplary construction of a control system of the above digital image forming apparatus. The control system includes a scanner control device 31, a video signal process device 32, an image process device 33, a system control device 34, a memory device 35, a primer control device 36 and a LED writing control device 37.

An image signal generated by the image sensor (CCD) 9 is amplified to an appropriate level to be converted to a digital signal being synchronized with a 20 MHx clock by the video signal process device 32 and is then outputted as digital data of 8 bits. The image process device 33 sends to the video signal process device 32 a signal to determine a timing to stars reading an image with the image sensor (CCD) 9 and the 20 MHZ clock signal as well.

Figure 3:
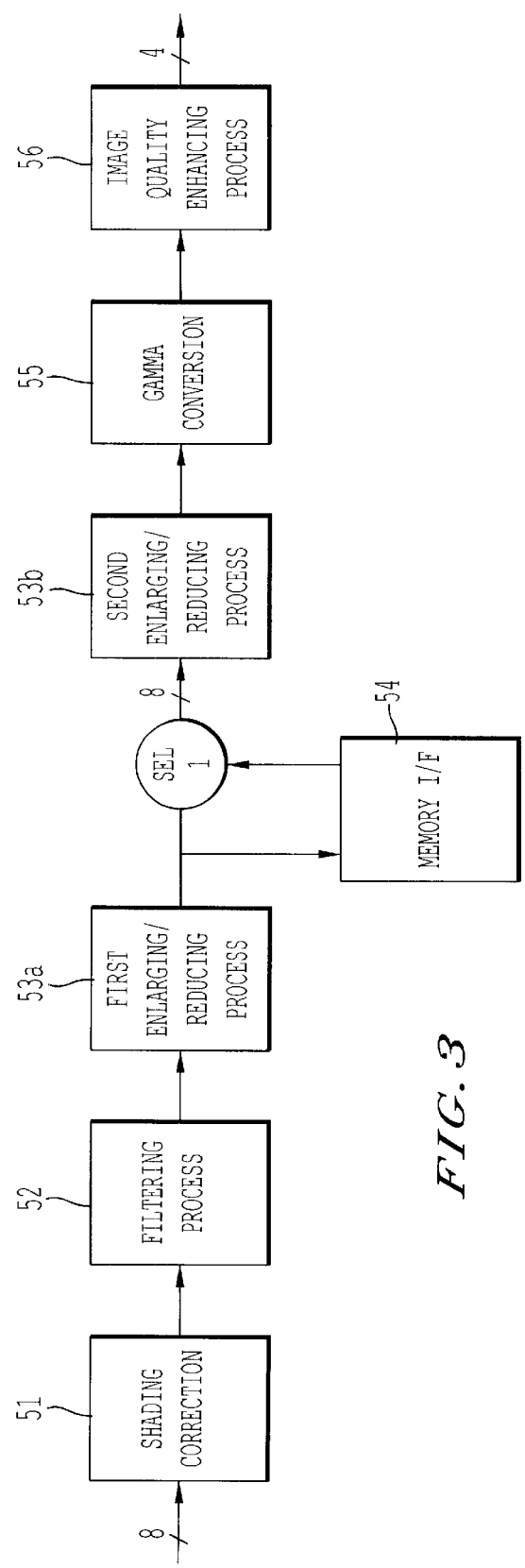
FIG. 3 is a block diagram illustrating an exemplary structure of an image process device of the control system of the digital image forming apparatus of FIG. 1, according to an embodiment of the present invention.

FIG. 3 illustrates an exemplary construction of the image process device 33 according to an embodiment of the present invention. The image process device 33 includes a shading correcting device 51, a filtering process device 52, a first enlarging/reducing process device 53a, a memory interface device 54, a second enlarging/reducing process device 53b, a gamma conversion device 55, and an image quality enhancing process device 56. As illustrated in FIG. 3, the first and second enlarging/reducing process devices 53a and 53b are arranged upstream and downstream of the memory interface device 54, respectively, in the direction in which image data is sent.

The shading correcting device 51 corrects a lower density level for black, which is caused by dark current of the image sensor (CCD) 9, by way of subtracting corresponding image data for black from image data for an original document. The shading correcting device 51 also corrects unevenness in the density of an image, which is caused by unevenness in the quantity of light from the light source 4 in the main scanning direction or unevenness in the sensitivity of CCD elements of the image sensor (CCD) 9. The shading correcting device 51 corrects such unevenness in the density of an image by first reading a white board having a uniform density, storing image data for each picture element of the white board in a memory, and then dividing image data of an original document, which is obtained by the image sensor (CCD) 9, with the image data for the white board.

The filtering process device 52 corrects image blur, which is caused by the optical frequency characteristics of the optical system, including the mirrors 3, 6 and 7, the lens 8 and the image sensor (CCD) 9, of the image reading unit 1. The filtering process device 52 corrects such image blur by filtering image data of an original document, for example, with a two-dimensional filtering circuit.

The first and second enlarging/reducing process devices 53a and 53b enlarge and reduce the magnification ratio for the main scanning direction using interpolation, such as, for example, a three-dimensional convolution method.

The gamma conversion device 55 converts gamma of image data such that the gradation of an image becomes smooth when the image is formed with the printer unit 11. The image quality enhancing process device 56 applies various image quality enhancing processes to the image data of an original document according to the operation mode selected by the user. For example, when the original document contains only characters, a process to increase the density level for black is increased so as to increase the legibility of the characters. Also, the image data of an original document having 256 gradations is converted to image data having 16 gradations using such a method as, for example, a dither method, so as to be outputted to the printer unit 11.

Image data processed by the image process device 33 is sent to the printer control device 36, and the data is sent to the LED writing head control device 37 being synchronized with a writing clock signal of the LED writing head control device 37. The LED writing head control device 37 controls the pulse width and the current to be given to each of the semiconductor laser elements of the laser array unit 14 in accordance with the image data of 4 bits having 16 gradations.

Image data having been processed by the first enlarging/reducing process device 53a is sent to the memory device 35 through the memory interface device 54.

The image data read and outputted from the image memory device 35 is processed with the second enlarging/reducing process device 53b, the construction of which is substantially the same as that of the first enlarging/reducing process device 53a. The magnification ratio for the main scanning direction of the image is changed through the processing with the second enlarging/reducing process device 53b.

An operation to store image data of an original document in the image memory device 35 and then outputting an image of the original document by reading the image date of the original document from the memory device 35 is explained referring to FIGS. 1 and 2. After an original document is placed on the contact glass 2 with the surface carrying an image facing downward, when a start button (not shown) of the digital image forming apparatus is depressed, a scanning start signal is given to the image process device 33 from a CPU of the system control device 34 and a signal to read an image of the original document with the image sensor (CCD) 9 is made to be active. The case 5 including the light source 4 and the mirror 3 starts to move to left in FIG. 1 so as to scan and read the original document in the sub scanning direction. A light reflected from the original document carrying image information of the original document reaches the image sensor (CCD) 9 through the mirrors 3, 6 and 7 and the lens 8.

The image sensor (CCD) 9 converts the received light into an analog electrical signal. The signal is then converted to a digital signal with the video signal process device 32 and is then sent to the image process device 33. Various image processing operations are applied to the image data as described above with the image process device 33, and the image data is then sent to the memory device 35 via the memory interface device 54 to be stored in the memory device 35.

The image data stored in the memory device 35 is read in accordance with an instruction from the system control device 34. A synchronizing signal for aligning a timing to start reading image data from the memory device 35 for the main scanning direction is generated by the memory device 35 under control of the system control device 34. Gate signals for the main and sub scanning directions for reading image data from the memory device 35 are also generated by the memory device 35 in accordance with information regarding the size of the original document given by the system control device 34. Because the image is written on the surface of the photoconductor drum 12 by way of the laser array unit 14, the interval between-main scanning lines is determined by controlling the interval of generating the synchronizing signal for the main scanning direction. That is, the magnification ratio for the sub scanning direction is changed by controlling the interval of generating the synchronizing signal for the main scanning direction. When the interval of generating the synchronizing signal for the main scanning direction is increased, the image is enlarged, and when the interval of generating the synchronizing signal is reduced, the image is reduced.

The image data is then processed with the gamma conversion device 55 for gamma conversion and with the image quality enhancing device 56 for enhancing the image quality and converting the gradation of the image data to meet with that of the printer unit 11. The image data is then sent to the printer control device 36.

The purpose of changing the magnification ratio for the image date stored in the memory device 35 is to slightly change the size of the image. Therefore, the range of the magnification ratio desired is relatively small, such as for example, a range from 90% to 110% of the original size. On the other hand, high accuracy in the magnification is desired, whereby, for example, the outputted size of the image is deviated from the desired size by less than about 0.1% of the desired size.

Figure 4:
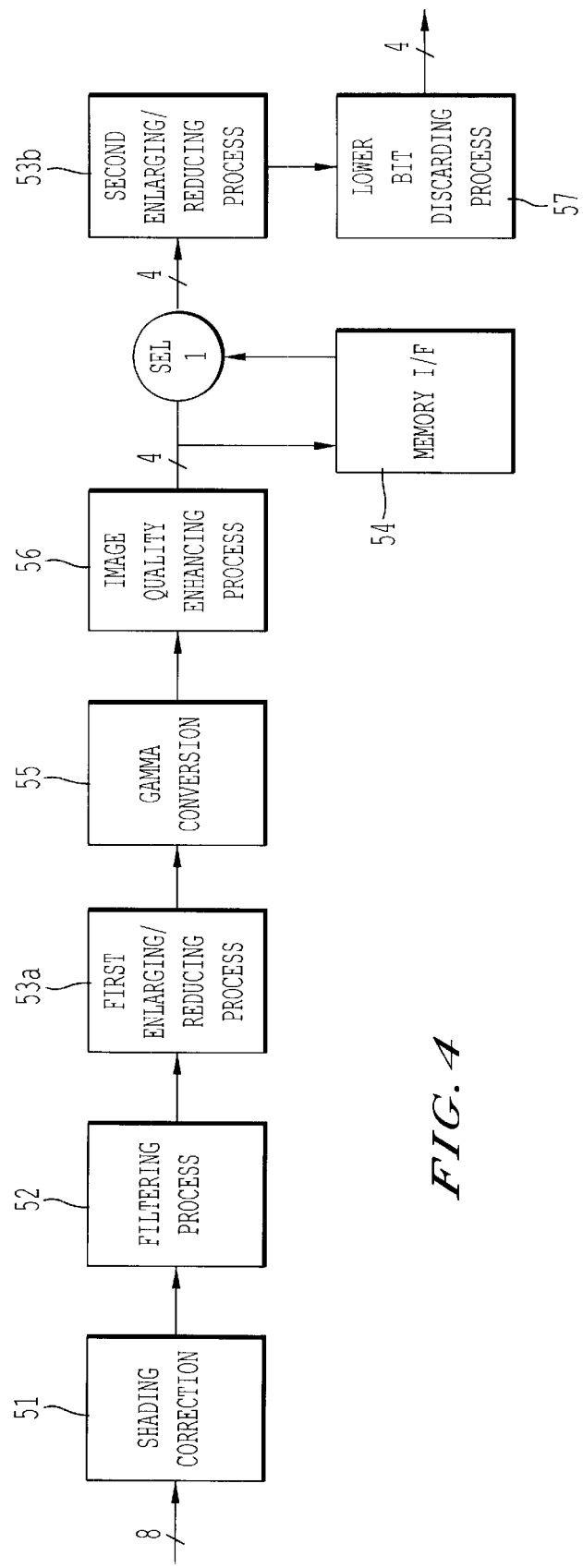
FIG. 4 is a block diagram illustrating an exemplary structure of the image process device according to another embodiment of the present invention.

FIG. 4 is a block diagram of the image process device 33 according to another embodiment of the present invention. The image process device 33 includes a shading correcting process device 51, a filtering process device 52, a first enlarging/reducing process device 53a, a gamma conversion device 55, an image quality enhancing process device 56, a memory interface device 54, a second enlarging/reducing process device 53b, and a lower bit discarding process device 57. As illustrated in FIG. 4, the first and second enlarging/reducing process devices 53a and 53b are arranged upstream and downstream of the memory interface device 54, respectively, in the direction in which data is sent, as in the first example of the image process device 33 illustrated in FIG. 3.

In this embodiment, image data processed with the shading correcting process device 51 and the filtering process device 52 is processed with the first enlarging/reducing process device 53a. The image data thus enlarged or reduced is then processed with the gamma conversion process device 55, converted to the image data of 4 bits by the image quality enhancing process device 56, and then stored in the memory device 35 via the memory interface device 54.

The image data of 4 bits, which is read from the memory device 35, is expanded to 8-bit data so that the data is processed with the second enlarging/reducing process device 53b. The image data expanded to 8-bit data is then processed with the second enlarging/reducing process device 53b such that the magnification ratio for the main scanning direction is changed. The image data processed with the second enlarging/reducing process device 53b is then outputted to the printer unit 11 after the lower 4 bits are discarded with the lower bit discarding process device 57.

Figure 5:
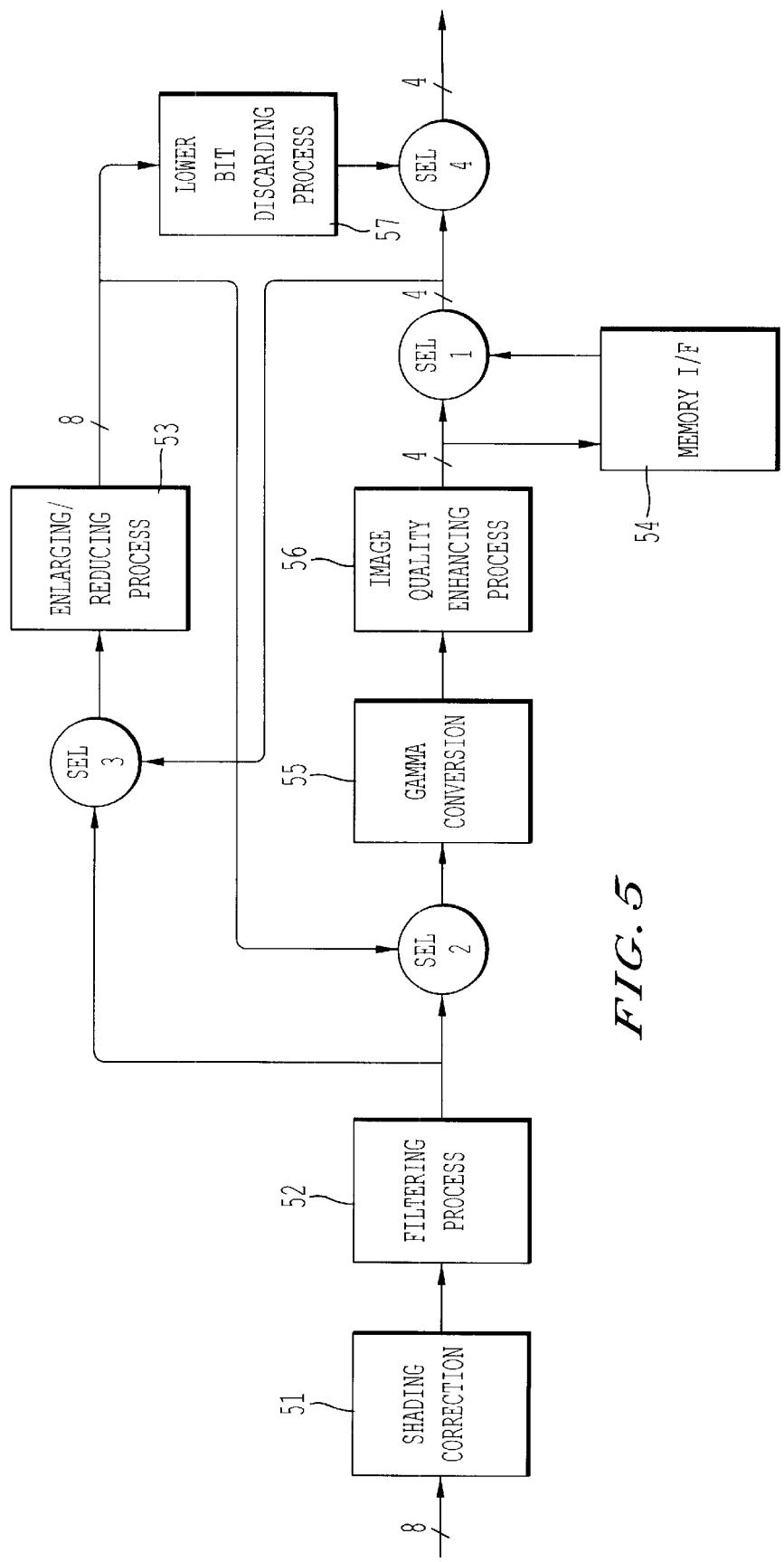
FIG. 5 is a block diagram illustrating an exemplary construction of the image process device according to still another embodiment of the present invention.

FIG. 5 illustrates an exemplary construction of the image process device 33 according to still another embodiment of the present invention. In this embodiment, the image process device 33 includes a single enlarging/reducing process device 53 and is configured such that the enlarging/reducing process is applied to image data upstream and downstream of the memory interface device 54, respectively, by way of using the single enlarging/reducing process device 53. The image data having the 8 bit length, after having been processed with the filtering process device 52, is processed with the enlarging/reducing process device 53 by switching the selector 3, and the image data after having been processed with the enlarging/reducing process device 53 is switched by the selector 2 to a path to the gamma conversion process device 55. The image data processed with the gamma process device 55 is then processed with the image quality enhancing process device 56 and stored in the memory device 35 via the memory interface device 54.

The image data having the 4 bit length, which is read from the memory device 35, is expanded to the data having the 8 bit length. The selector 3 is switched so as to send the image data read from the memory device 35 to the enlarging/reducing process device 53, which then changes the magnification ratio for the main scanning direction.

Because the single enlarging/reducing process device 53 is used for enlarging and reducing image data upstream and downstream of the memory interface device 54 respectively, the cost of the image process device 33 is suppressed.

Another embodiment of the present invention incorporating another aspect of the present invention will now be described. In this embodiment, the image process device 33 has substantially the same configuration as illustrated in FIG. 3. The first and second enlarging/reducing process devices 53a and 53b are arranged upstream and downstream of the memory interface device 54, respectively, and 8-bit image data, which is processed with the first enlarging/reducing process device 53a, after having been processed with the shading correcting process device 51 and the filtering process device 52, is stored in the memory device 35 through the memory interface device 54, and 8-bit image data read from the memory device 35 is processed again with the second enlarging/reducing process device 53b. The magnification ratio for the main scanning direction is changed by the second enlarging/reducing process device 53b and the magnification ratio for the sub scanning direction is changed by controlling the interval of generating the synchronizing signal for the main scanning direction.

Figure 6:
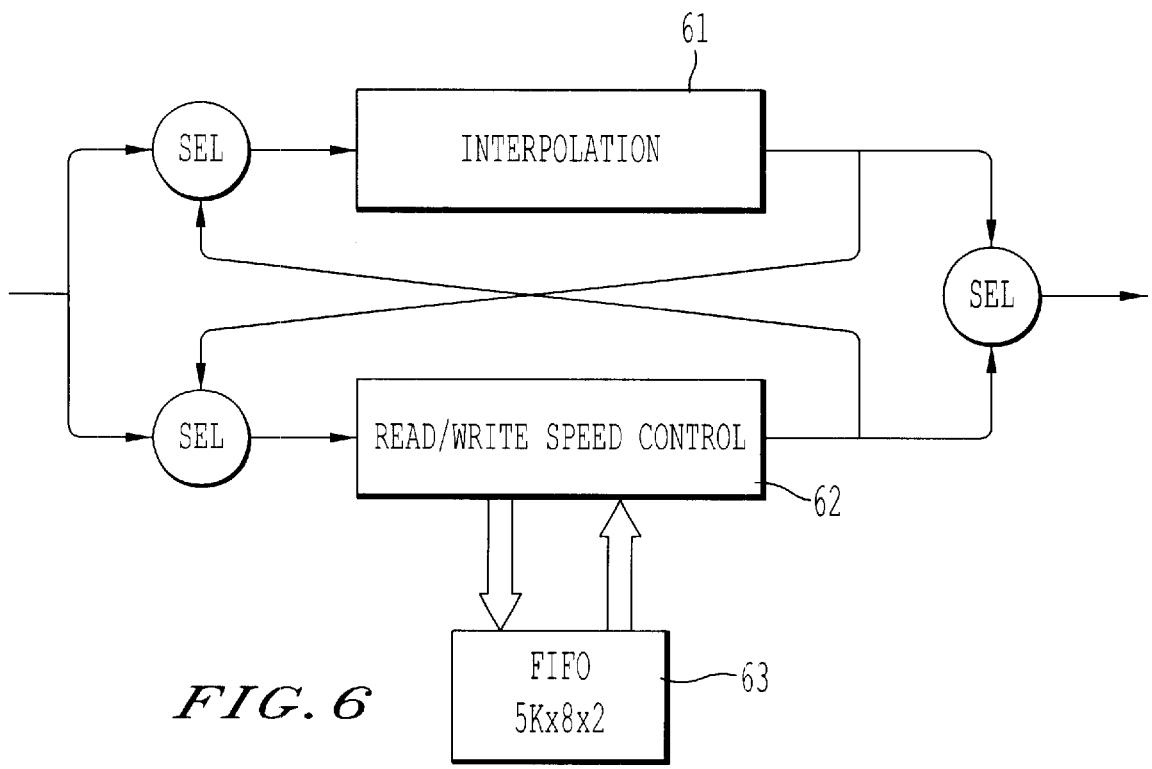
FIG. 6 is a block diagram illustrating an exemplary construction of a first enlarging/reducing process device of the image process device of FIG. 3, according to the present invention.
Figure 7:
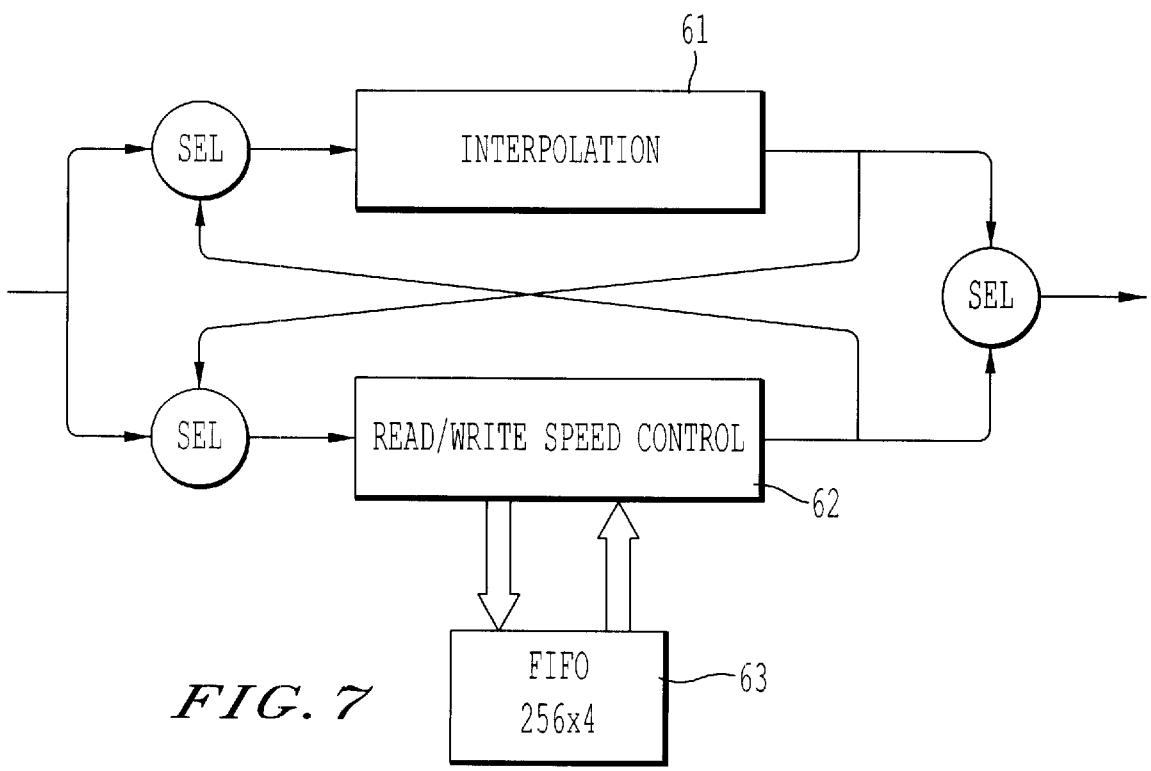
FIG. 7 is a block diagram illustrating an exemplary construction of a second enlarging/reducing process device of the image process device of FIG. 3 according to the present invention.

FIG. 6 is a block diagram illustrating an exemplary construction of the first enlarging/reducing process device 53a and FIG. 7 is a block diagram illustrating an exemplary construction of the second enlarging/reducing process device 53b according to this another embodiment of the present invention. The first enlarging/reducing process device 53a and the second enlarging/reducing process device 53b respectively include an interpolation device 61, a read/write speed control device 62. and a FIFO memory 63, as illustrated in FIGS. 6 and 7.

The FIFO memory 63 of the first enlarging/reducing process device 53a has the memory capacity to store image date obtained by reading the image of an original document for one line in the main scanning direction. When enlarging the image, image data of one line of the main scanning is stored once in the FIFO memory 63. The image data stored in the FIFO memory 63 is read from the memory device 35 at a speed being controlled with the read/write speed control device 62 according to a magnification ratio instructed from the system control device 34. The interpolation device 61 calculates data to be inserted into the image data read from the image memory device 35 according to the read image data using interpolation. The algorithm of interpolation performed by the interpolation device 61 is well known and therefore the description is omitted.

When reducing the image, the image data is first processed with the interpolation device 61 and thereby virtual sampling points for reducing the image are generated. The image data thus processed is then stored in the FIFO memory 63 under the control of the read/write speed control device 62. The image data written in the FIFO memory 63 is read at a predetermined speed. The FIFO memory 63 is configured to include two FIFO memory devices, and writing and reading image data to and from the FIFO memory 63 are toggle switched between these two FIFO memory devices. By thus configuring the FIFO memory 63 with two FIFO memory devices, the circuit is simplified and shifting an image when outputting the image to the printer device 11 is made possible.

Figure 8A:
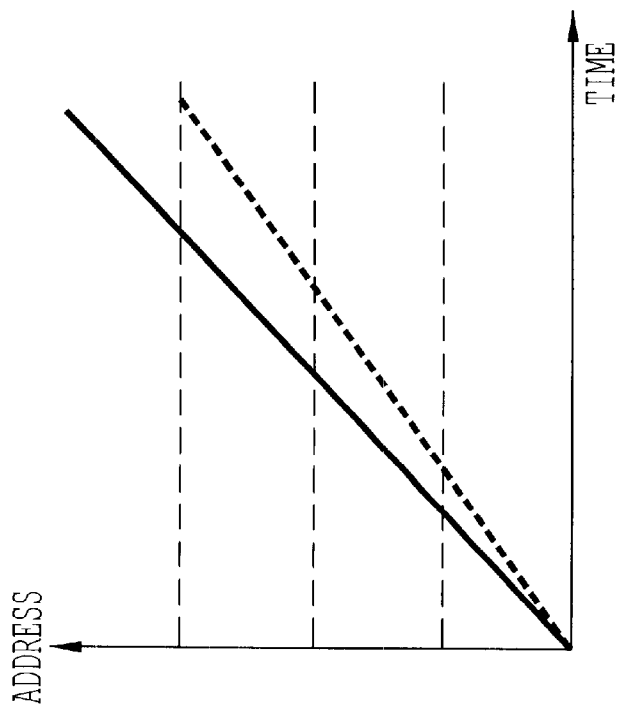
FIGS. 8(a) and 8(b) are diagrams for explaining the operation of a FIFO memory used in an enlarging/reducing process device of the image process device according to the present invention when enlarging an image, FIG. 8(a) explaining the operation when the FIFO memory has the memory capacity to store image data for one line of the main scanning and FIG. 8(b) explaining the operation when the FIFO memory has a limited memory capacity.
Figure 8B:
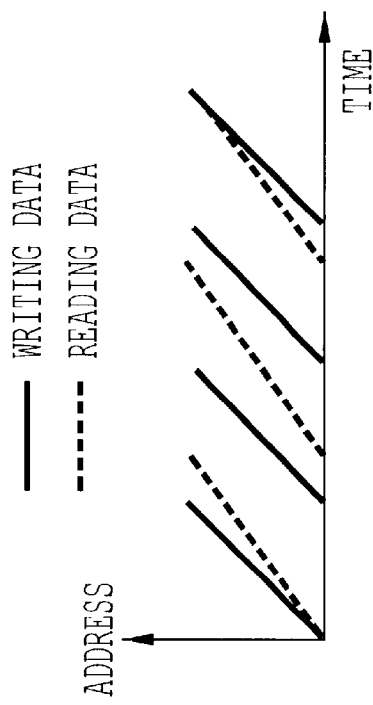

FIGS. 8(a) and 8(b) are diagrams for explaining the operation of the FIFO memory 63 when enlarging an image, assuming that the range of magnification ratio can be changed between 95% and 105% of the original size with the second enlarging/reducing process device 53b and shifting of an image is not required. FIG. 8(a) explains the operation when the FIFO memory 63 has the memory capacity for storing image data of one line in the main scanning direction and FIG. 8(b) explains the operation when the FIFO memory 63 has a limited memory capacity. FIGS. 9(a) and 9(b) are diagrams for explaining the operation of the FIFO memory 63 when reducing an image, FIG. 9(a) explaining the operation when the FIFO memory 63 has the memory capacity for storing image data of one line in the main scanning direction and FIG. 9(b) explaining the operation when the FIFO memory 63 has a limited memory capacity.

When enlarging an image, referring to FIG. 8(a), assuming that the FIFO memory 63 has, for example, the memory capacity for 5000 picture elements, because the speed of reading image data from the FIFO memory 63 is slower then the speed of writing image data into the FIFO memory 63, when a writing operation for one line is completed, a reading operation for one line is not yet completed. Further, when the writing operation for the next line starts, the reading operation again starts from the reading start position. When the magnification ratio for enlarging an image is, for example, 105%, the difference in the writing and reading addresses in the FIFO memory 63 when the writing operation for one line is completed is given by 5% of 5000 picture elements, i.e., 250 picture elements.

Referring to FIG. 8(b), in which the memory capacity of the FIFO memory 63 is limited, if the capacity of the FIFO memory 63 is smaller than the volume of image data for one line in the main scanning direction, image data for the next line will be written over the previously written image data in the FIFO memory 63. However, if the operation of reading image data is completed before the operation of writing image data for the next line starts, the image data for the next line will not be written over the previously written image data.

Because the maximum difference in the writing and reading addresses in the FIFO memory 63 when the writing operation for one line is completed is 250 picture elements when the magnification ratio for enlarging an image is 105%, as described above, if the FIFO memory 63 has the capacity to store at least image data for 250 picture elements, image data stored in the FIFO memory 63 will not be overwritten by subsequent image data.

When reducing an image, referring to FIG. 9(a), because the writing speed is slower then the reading speed, the reading operation catches up the writing operation unless the reading operation is started a certain time after the writing operation is started. When the magnification ratio for reduction is, for example, 95%, if the difference in the addresses to start reading and writing image data in the FIFO memory 63 is over 250-picture elements, the reading operation will not catch up the writing operation and thereby image data will be read from the FIFO memory 63.

In FIG. 9(b), the FIFO 63 memory is configured to have the capacity for storing 250 picture elements and further the reading operation is controlled to start after a time corresponding to writing 250 picture elements, and thereby image data is read from the FIFO memory 63.

Thus, the capacity of the FIFO memory 63 can be suppressed and thereby the cost of the enlarging/reducing process device 33 can be reduced when the magnification ratio for enlarging and reducing an image is relatively small.

Numerous additional modifications and variations of the present invention are possible in light of the above teachings. It is therefore to be understood that within the scope of the appended claims, the present invention may be practiced otherwise than as specifically described herein.

The document claims priority and contains subject matter related to Japanese patent application No. 10-015169 filed in the Japanese Patent Office on Jan. 9, 1998, the entire contents of which are hereby incorporated by reference.

What is claimed is:

1. An image forming apparatus, comprising:
   a photoconductor;
   an image reading device to receive and read a light reflected from an original document carrying image data of an image of the original document and to convert the received light carrying the image data into an analog electrical signal carrying the image data;
   an analog-to-digital converter to convert the analog electric signal carrying the image data into a digital signal carrying the digital image data;
   a memory to store the digital image data;
   an image writing device to form an image according to the digital image data on a surface of the photoconductor with a light beam modulated according to the digital image data;
   a first enlarging/reducing device, to change a magnification ratio of the image, provided upstream of the memory in a direction in which the digital image data is sent; and
   a second enlarging/reducing device to change a magnification ratio for a main scanning direction of the image, provided downstream of the memory in the direction in which the digital image data is sent,
   wherein, the digital image data processed with the first enlarging/reducing device is stored in the memory and the digital image data read from the memory is again processed with the second enlarging/reducing device.

2. The image forming apparatus of claim 1, wherein the image reading device comprises a line sensor to read a line of the original document and the memory has a capacity to store digital image data for the line of the original document.

3. An image forming apparatus, comprising:
   a photoconductor;
   an image reading device to receive and read a light reflected from an original document carrying image data of an image of the original document and to convert the received light carrying the image data into an analog electrical signal carrying the image data;

an analog-to-digital converter to convert the analog electrical signal carrying the image data into a digital signal carrying the digital image data;

a memory to store the digital image data;

an image writing device to form an image according to the digital image data on a surface of the photoconductor with a light beam modulated according to the digital image data;

a first enlarging/reducing device, to change a magnification ratio of the image, provided upstream of the memory in a direction in which the digital image data is sent;

a second enlarging/reducing device to change a magnification ratio for a main scanning direction of the image, provided downstream of the memory in the direction in which the digital image data is sent; and an image quality enhancing device to process the digital image data to enhance a quality of the image according to the digital image data;

wherein, the digital image data processed with the first enlarging/reducing device and processed with the image quality enhancing device is stored in the memory and the digital image data read from the memory is again processed with the second enlarging/reducing device.

4. The image forming apparatus of claim 3, wherein the image reading device comprises a line sensor to read a line of the original document and the memory has a capacity to store digital image data for the line of the original document.

5. An image forming apparatus, comprising:

a photoconductor;

an image reading device to receive and read a light reflected from an original document carrying image data of an image of the original document and to convert the received light carrying the image data into an analog electrical signal carrying the image data;

an analog-to-digital converter to convert the analog electric signal carrying the image data into a digital signal carrying the digital image data;

a memory to store the digital image data;

an image writing device to form an image according to the digital image data on a surface of the photoconductor with a light beam modulated according to the digital image data;

an enlarging/reducing device to change a magnification ratio for the image;

a first switch device to switch the digital image data to the enlarging/reducing device upstream of the memory in a direction in which the digital image data is sent; and a second switch device to switch the digital image data read from the memory to the enlarging/reducing device so as to change a magnification ratio for a main scanning direction of the image.

6. The image forming apparatus of claim 5, wherein the image reading device comprises a line sensor to read a line of the original document and the memory has a capacity to store digital image data for the line of the original document.

7. The image forming apparatus of claim 5, wherein a capacity of a FIFO memory used in the second enlarging/reducing device is smaller than a capacity of a FIFO memory used in the first enlarging/reducing device.

8. An image forming apparatus, comprising;

a photoconductor;

image reading means for receiving and reading a light reflected from an original document carrying image data of an image of the original document and for converting the received light carrying the image data into an analog electrical signal carrying the image data;

an analog-to-digital converting means for converting the analog electrical signal carrying the image data into a digital signal carrying the digital image data;

memory means for storing the digital image data;

image writing means for forming an image according to the digital image data on a surface of the photoconductor with a light beam modulated according to the digital image data;

first enlarging/reducing means, for changing a magnification ratio for the image, provided upstream of the memory means in a direction in which the digital image data is sent; and second enlarging/reducing means, for changing a magnification ratio for a main scanning direction of the image, provided downstream of the memory means in the direction in which the digital image data is sent;

wherein the digital image data processed with the first enlarging/reducing means is stored in the memory means and the digital image data read from the memory means is again processed with the second enlarging/reducing means.

9. The image forming apparatus of claim 8, wherein the image reading means comprises a line sensor to read a line of the original document and the memory means has a capacity to store digital image date for the line of the original document.

10. The image forming apparatus of claim 9, wherein a capacity of a FIFO memory used in the second enlarging/reducing means is smaller than a capacity of a FIFO memory used in the first enlarging/reducing means.

11. An image forming apparatus, comprising:

a photoconductor;

image reading means for receiving and reading a light reflected from an original document carrying image data of an image of the original document and for converting the received light carrying the image data into an analog electrical signal carrying the image data;

analog-to-digital converting means for converting the analog electrical signal carrying the image data into a digital signal carrying the digital image data;

memory means for storing the digital image data;

image writing means for forming an image according to the digital image data on a surface of the photoconductor with light beam modulated according to the digital image data;

first enlarging/reducing means for changing a magnification ratio for the image, said first enlarging/reducing means provided upstream of the memory means in a direction in which the digital image data is sent;

second enlarging/reducing means for changing a magnification ratio for a main scanning direction of the image, said second enlarging/reducing means provided downstream of the memory means in the direction in which the digital image data is sent; and image quality enhancing means for processing the digital image data to enhance a quality of the image according to the digital image data, wherein the digital image data processed with the first enlarging/reducing means and processed with the image quality enhancing means is stored in the memory means and the digital image data read from the memory means is again processed with the second enlarging/reducing means.

12. The images forming apparatus of claim 11, wherein the Image reading means comprises a line sensor to read a line of the original document and the memory means has a capacity to store digital image data for the line of the original document.

13. An image forming apparatus, comprising:

a photoconductor;

image reading means for receiving and reading a light reflected from an original document carrying image data of an image of the original document and for converting the received light carrying the image data into an analog electrical signal carrying the image data;

analog-to-digital converting means for converting the analog electrical signal carrying the image data into a digital signal carrying the digital image data;

memory means for storing the digital image data;

image writing means for forming an image according to the digital image data on a surface of the photoconductor with a light beam modulated according to the digital image data;

enlarging/reducing means for changing a magnification ratio for the image;

first switching means for switching the digital image data to the enlarging/reducing means upstream of the memory means in a direction in which the digital image data is sent; and second switching means for switching the digital image data read from the memory means to the enlarging/reducing means so as to change a magnification ratio for a main scanning direction of the image.

14. The image forming apparatus of claim 13, wherein the image reading means comprises a line sensor to read a line of the original document and the memory means has a capacity to store digital image data for the line of the original document.

15. A method of forming an image, comprising the steps of:

providing a photoconductor;

reading a light reflected from an original document carrying image data of an image of the original document and converting the received light carrying the image data into an analog electrical signal carrying the image data;

converting the analog electrical signal carrying the image data into a digital signal carrying the digital image data;

processing the digital image data to change a magnification ratio for the image according to the digital image data;

storing the processed digital image data in a memory; and reading the processed digital image data stored in the memory to output the image according to the stored processed image data and processing the stored processed digital image data again to change a magnification ratio for a main scanning direction of the image.

16. The method of claim 15, wherein a light reflected from a line of the original document is read at the reading step.

17. The method of claim 15, further comprising the step of:

processing digital image data to enhance a quality of the image according to the digital image data.

18. The method of claim 17, wherein the image data which is processed to change a magnification ratio of the image according to the image data is stored in the memory after having been processed by the quality enhancing processing step.

* * * * *